Figure 1:
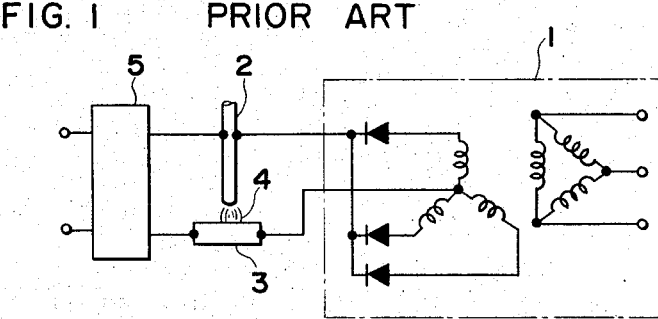

United States Patent
Okada

[11] 3,775,585
[45] Nov. 27, 1973

[54] CURRENT CONTROL FOR PULSE ARC WELDING

[75] Inventor: Toshiyuki Okada, Osaka, Japan

[73] Assignee: Osaka Transformer Co., Ltd., Osaka-shi, Osaka-fu, Japan

[22] Filed: Nov. 15, 1971

[21] Appl. No.: 198,623

[30] Foreign Application Priority Data
Nov. 13, 1970 Japan .......... 45/99464

[52] U.S. Cl. .......................... 219/131 R, 219/135
[51] Int. Cl. .................................. B23k 9/10
[58] Field of Search .............. 219/130, 131, 135, 219/137, 136, 74; 323/22 SC

[56] References Cited
UNITED STATES PATENTS

| | | | |
|---|---|---|---|
| 3,588,465 | 6/1971 | Anderson et al. | 219/131 R |
| 3,584,186 | 6/1971 | Stearns et al. | 219/131 WR |
| 3,356,928 | 12/1967 | Parrish | 219/131 R |
| 3,371,242 | 2/1968 | Aldenhoff et al. | 219/135 |
| 3,459,920 | 8/1969 | Sevenco | 219/131 R |
| 3,249,735 | 5/1966 | Needham | 219/131 R |

FOREIGN PATENTS OR APPLICATIONS 185,425  8/1966  U.S.S.R. .......... 219/131 R

Primary Examiner—R. F. Staubly
Assistant Examiner—George A. Montanye
Attorney—Craig, Antonelli, Stewart & Hill

[57] ABSTRACT

A pulse arc welding method and device for maintaining a pulse current at a constant value, which said current is periodically superimposed with DC welding current, even when the power source voltage or arc voltage has changed, through the interposition of a pulse current detector and pulse current control equipment, and to feed back the output thereof to the pulse current control equipment through the detection of the pulse current by the pulse current detector.

3 Claims, 6 Drawing Figures

CURRENT CONTROL FOR PULSE ARC WELDING

The present invention relates to a pulse arc welding method wherein the pulse current is periodically superimposed with the DC arc welding current to carry out the arc welding, and a pulse arc welding device for performing the above mentioned method.

In a conventional DC arc welding method, a pulse current method has been employed wherein the pulse current is periodically superimposed with a DC current, or the melted metal produced at a welding electrode end is fine-grained to move to a base metal by connecting a rectifier to the output side of a polyphase power source transformer, and by causing peak wave current to flow by unbalancing one phase or more of the polyphase power source transformer. The power to turn the melting metal of the welding electrode end into the fine-grain is created by a powerful electromagnetic contraction due to the intensity of the pulse current, the intensity of the pulse current being required to be more than a given value depending upon the material quality and size of the electrode wire to be employed, and the intensity of the welding current. However, as the pulse current becomes excessive, the electrode wire is melted more, whereby the length of the arc becomes excessive for the purpose of welding. Accordingly, the intensity of the pulse current has to be retained, at all times, to a proper value. Generally, there is established the relationship $I = (Vs - Va)/Z$, wherein I is the pulse current, Vs the power source voltage, Va the arc voltage and Z the impedance of the circuit. The changes in the power source voltage Vs, the arc voltage Va or the circuit impedance Z alter the pulse current I. Also, if wire of the same material, quality and size is used, the arc voltage has to be adjusted to a proper value when the power source voltage or the like has been changed; at this time the pulse current must be reset to a proper value.

However, in a conventional pulse arc welding device, as shown in FIG. 1, for example, an electrode 2 and a base material 3, respectively, were connected to the output side of a DC arc welding power source 1 to produce an arc 4 therebetween, the pulse current being supplied between the electrode 2 and the base material 3 from the pulse producing device 5. In the conventional device as described hereinbefore, since equipment for controlling the pulse current to a fixed value was not provided, the pulse current could not be maintained at a fixed value when the arc voltage varied due to changes in the power source voltage.

The present invention provides a pulse arc welding method and a pulse arc welding device for carrying out the method, wherein a pulse current detector and a pulse current control device are provided, the pulse current being detected by a pulse current detector to feed the output thereof back to the pulse current control device, whereby the pulse current is adapted to remain fixed even when the power source voltage or the arc voltage has changed.

The pulse arc welding method in accordance with the present invention employs control equipment for controlling the intensity of the pulse current to be additionally provided, and pulse current detection equipment for detecting the intensity of the pulse current in a welding circuit, the intensity of the pulse current component of the welding current is controlled to remain almost constant through the feedback of the pulse current detector output into the control equipment.

Figure 2:
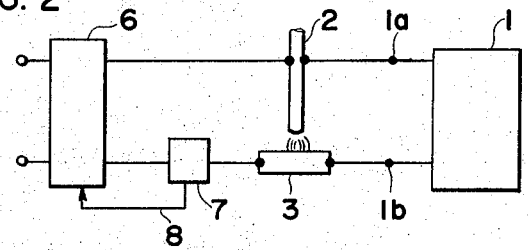

The device for practicing the method in accordance with the present invention will be described in conjunction with a preferred embodiment shown in the accompanying drawings, in which;

FIG. 1 is a schematic diagram showing the construction of a conventional pulse arc welding device, FIG. 2 is a schematic diagram showing the construction of the pulse arc welding device in accordance with the present invention, and FIGS. 3 to 6 are electric connection diagrams showing an embodiment of the device in accordance with the present invention.

Referring now to FIG. 2, there is shown one exemplary arrangement of the device according to the present invention. Reference character 1 is a DC arc welding power source, 2 and 3 being the electrode and the base material connected, respectively, to the output terminals 1a and 1b of the DC arc welding power source 1. Reference character 6 is the pulse control equipment for controlling the intensity of the pulse current to be provided additionally, one of the input terminals thereof being connected to the electrode 2 and the other thereof being connected, through the pulse current detector 7, to the base material 3. The output of the pulse current detector 7 is fed back to the pulse control equipment 6 through the feed back path 8. Also, the pulse control equipment consists of pulse producing means, adjusting means for adjusting the intensity of the pulse current therof, and control means for setting the output signal of the pulse detector as an input and for controlling the adjusting means, so that the intensity of the pulse current to be additionally provided may remain at a fixed value.

Figure 3:
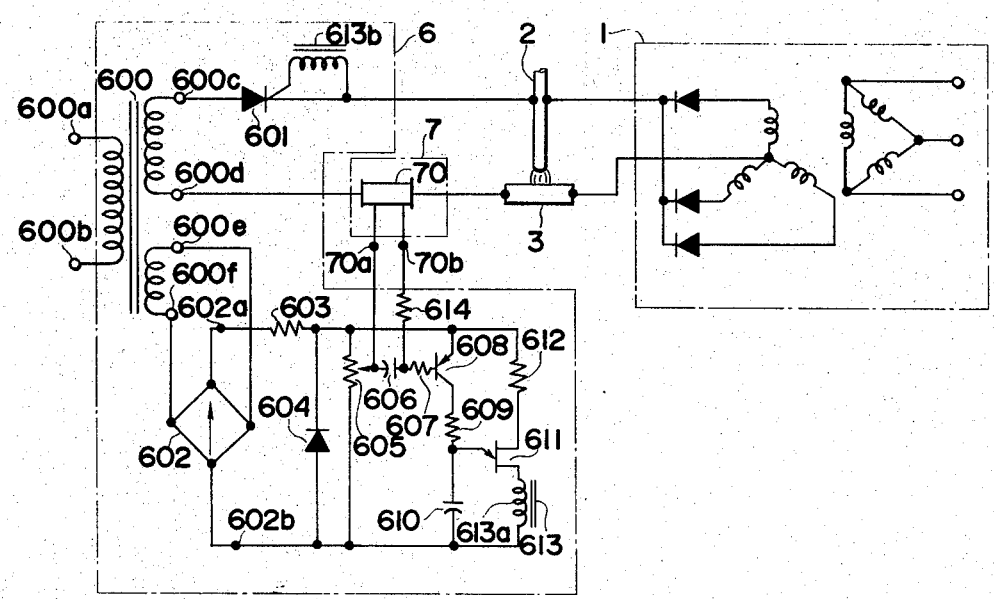

Referring to FIG. 3, there is shown a preferred embodiment of the device in accordance with the present invention. Reference characters 1 through 3, are respectively, the DC arc welding power source, the electrode and the base material as in FIG. 1. The pulse control equipment 6 has a transformer 600 as the power source, and a thyristor 601 as a pulse producing means, an AC power source (not shown) being connected between the primary terminals 600a and 600b of the transformer 600. The transformer 600 is also provided with two secondary windings, wherein one end 600c of the first secondary winding is connected, through a thyristor 601, to the electrode 2, the other end 600d thereof being connected, through a shunt 70 consisting of the pulse current detector 7, to the base material 3. A rectifier bridge 602 is connected to each terminal 600e and 600f of the second secondary winding of the transformer 600, the constant voltage diode 604 being connected, through a resistor 603, between the output terminals 602a and 602b of the rectifier bridge 602, while an ignition phase control circuit of the thyristor is connected between both ends of the constant voltage diode 604. The ignition phase control circuit is provided with a variable resistor (adjusting means) 605 for setting the pulse current value connected, in parallel, to the constant voltage diode 604, the slider of variable resistor 605 being connected, through a capacitor 606 and a resistor 607, to the base of the transistor 608. The emitter of the transistor is directly connected to one end of the variable resistor 605, the collector being connected, through the resistor 609 and the capacitor 610, to the other end of the variable resistor 605, the emitter of a unijunction transistor 611 ( hereinafter referred to as UJT ) being connected to the connection point of the resistor 609 and the capacitor 610. One base of the UJT 611 is connected to the cathode of a constant voltage diode 604 through the resistor 612, the other base thereof being connected, through the primary coil 613a of the pulse transformer 613, between the capacitor 610 and the anode of the constant voltage diode 604, the secondary winding 613b of the pulse transformer being connected ( control means ) between the gate of the thyristor 601 and its cathode. One terminal 70a of the shunt 70 in the detector and the other terminal 70b thereof, respectively, are connected to the slider of the variable resistor 605, and to the connecting point between the capacitor 606 and the resistor 607 through the resistor 614.

In the above described device, the capacitor 610 connected to the emitter of the UJT 611 is charged by the collector current of the transistor 608, the control pulse being produced in the secondary winding 613b of the pulse transformer 613 when the terminal voltage of the capacitor has reached the trigger level of the UJT, whereby the thyristor 601 is turned on. Accordingly, pulse current of a frequency equal to that of the AC power source frequency is provided additionally to the welding current from the welding power source to carry out the pulse arc welding. The intensity of the pulse current is determined by a phase in which the UJT 611 produces the control pulses, the control pulse producing phase being determined by the intensity of the collector current of the transistor 608, the intensity of the collector current being determined by the intensity of the base current of the transistor 608, thus, the intensity of the pulse current being adjustable through the adjustment of the variable resistor 605.

The intensity of the pulse current, which is to be additionally provided to the welding current, is detected by the shunt 70, the voltage proportional to the pulse current value being fed back to both ends of the capacitor 606. Accordingly, the base current of the transistor 608 is controlled by the difference between the voltage corresponding to the set value of the pulse current set by the variable resistor 605, and the voltage fed back to both ends of the capacitor 606, whereby the intensity of the pulse current can be maintained normally at a fixed value.

As the pulse current becomes smaller than the set value through either an increase in the arc voltage or a decrease in the power source voltage, the output voltage of the shunt 70 becomes smaller, the terminal voltage of the capacitor 606 being lowered, the collector current of the transistor 608 being increased. As the time interval, during which the capacitor 610 is charged to the trigger level of the UJT, becomes shorter, the producing phase of the control pulse is advanced, and the ignition phase of the thyristor 601 is advanced, whereby the pulse current is increased to return to the set value. On the other hand, as the pulse current increases through either the falling of the arc voltage or the rising of the power source voltage, the terminal voltage of the capacitor 606 is increased, and the collector current of the transistor 608 is decreased. Thus, the producing phase of the control pulse is delayed to decrease the pulse current, whereby the pulse current is maintained at the set value.

Figure 4:
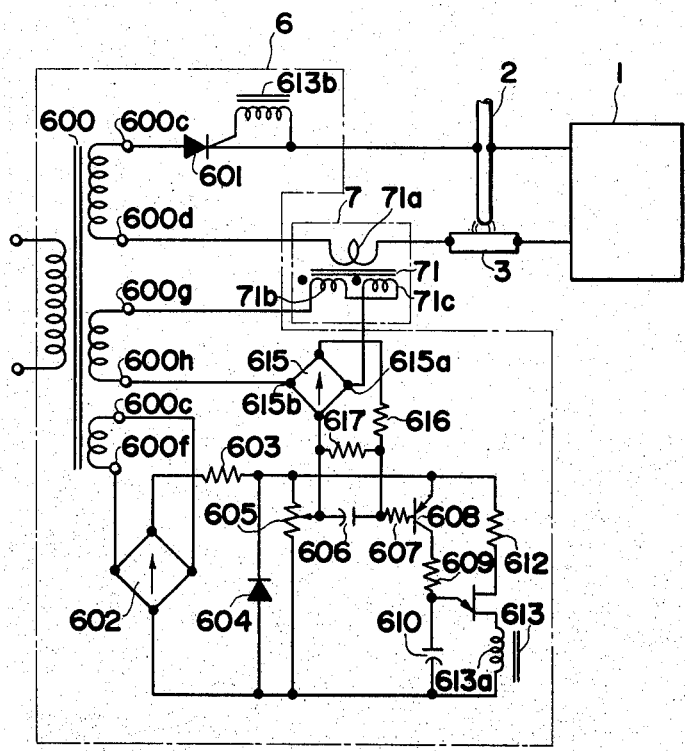

FIG. 4 shows the construction of the device according to the present invention wherein the DC current transformer 71 is employed in the form of a saturable reactor. Referring now to FIG. 4, a transformer 600 has three secondary windings. One end 600c of the first secondary winding of the transformer 600 is connected to the electrode 2 through the thyristor 601 as in FIG. 3, the other end 600d thereof being connected to a base material 3 through the input winding 71a of the transformer 71. Also, both ends 600e and 600f of the second secondary winding are connected to the rectifier bridge 602 as in FIG. 3, the output terminal thereof being connected, through the resistor 603, to the constant voltage diode 604 and the ignition phase control circuit. The current transformer 71 has two output windings 71b and 71c connected, in series, by being wound mutually in opposite directions, one end of the output winding serially connected being connected to one end 600g of the third secondary winding of the transformer 600, the other end of the output winding of the current transformer being connected to one input terminal 615a of the rectifier bridge 615, the other input terminal 615b of the rectifier bridge 615 being connected to end 600h of the third secondary winding. The resistor 617 is connected, through the resistor 616, to the output terminal of the rectifier bridge 615, the terminal voltage of the resistor 617 being adapted to be impressed upon both ends of the capacitor 616.

In the above described device, the magnetic flux corresponding to the pulse current is linked to each output winding of the current transformer 71 among the iron cores of each output winding, and the iron core of the output winding on the side where the caused magnetic flux becomes the same in direction as the created magnetic flux of the third secondary winding is saturated, whereby the impedance of the output winding is lowered. At this time, voltage corresponding to the pulse current is induced in the output winding of the transformer wound around the iron core on the side where the iron core is not saturated, whereby the voltage charges the capacitor 606. Accordingly, even in the device of FIG. 4, the detected value of the pulse current is fed back to the terminal of the capacitor 606 as in the device of FIG. 3, the pulse current being controlled to be maintained normally at the set value.

Figure 5:
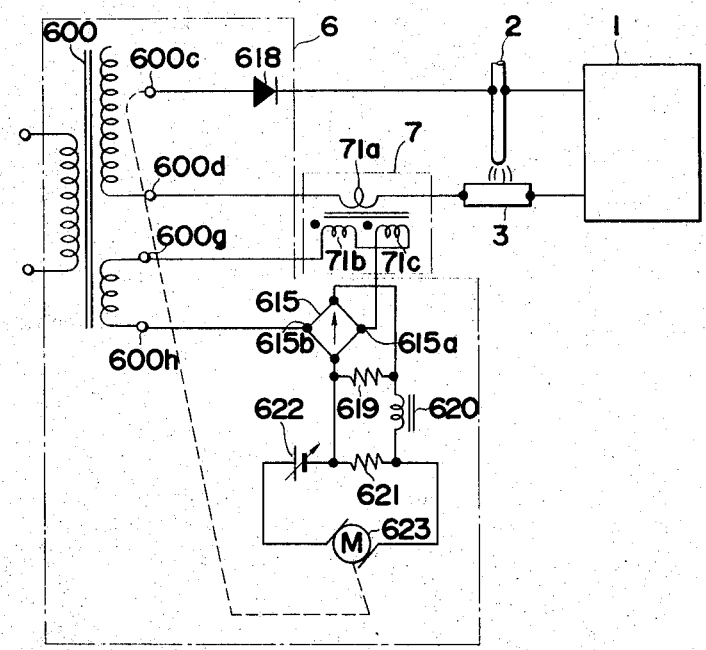

FIG. 5 shows another embodiment of the present invention, wherein reference numbers 1 to 6 represent the same portions as in FIGS. 2 to 4. The transformer 600 has two secondary windings, one terminal 600c of one secondary winding being a sliding terminal, which is connected, through a diode ( pulse producing means ) 618, to an electrode 2, the other terminal 600d being connected to the base material 3 through the input winding 71a of the current transformer 71 composed as in the device of FIG. 4. Both ends of two series connected output windings of the current transformer 710 are connected, through both ends 600g and 600h of the other secondary winding of the transformer 600, to the input end of the rectifier bridge 615 as in FIG. 4. The resistor 619 is in parallel connected in parallel with the output end of the rectifier bridge 615, the series circuit of the reactor 620 and resistor 621 being connected in parallel with the resistor. Also, the series circuit of the variable DC power source ( adjusting means ) 622 and of the motor 623 armature M is connected in parallel with the resistor 621, the sliding terminal 600c of the transformer 600 being displaced by the rotation of the DC motor ( control means ) to adjust the intensity of the pulse current supplied between the electrode and the base material.

In the device described hereinabove, the voltage corresponding to the detected pulse current appears at both ends of the resistor 621 and the difference between the voltage and the terminal voltage of the DC power source 622 is impressed upon the armature M of the motor. The terminal voltage of the DC power source 622 is set in intensity corresponding to the set value of the pulse current, no voltage being impressed upon the armature M when the pulse current is equal to the set value, whereby the slider 600a is not moved. However, the difference voltage is impressed upon the armature in accordance with the magnitude of change as the pulse current value changes. The sliding terminal 600c is set to slide in a direction in which the output current is decreased when the intensity of the pulse current is larger than the set value. Accordingly, the motor maintains the pulse current at the set value through the rotation of the rotor of motor M until the difference voltage becomes zero. In this example, the smoothing circuit consisting of the resistor 619 and the reactor 620 can be omitted by increasing the inertia of the DC motor to some extent. The sliding terminal of the transformer 600 displaced by the motor may be provided on the primary side, and also, the variable resistor may be inserted into the welding circuit, instead of providing the sliding terminal in the transformer, to slide the slider of the variable resistor by the motor.

Figure 6:
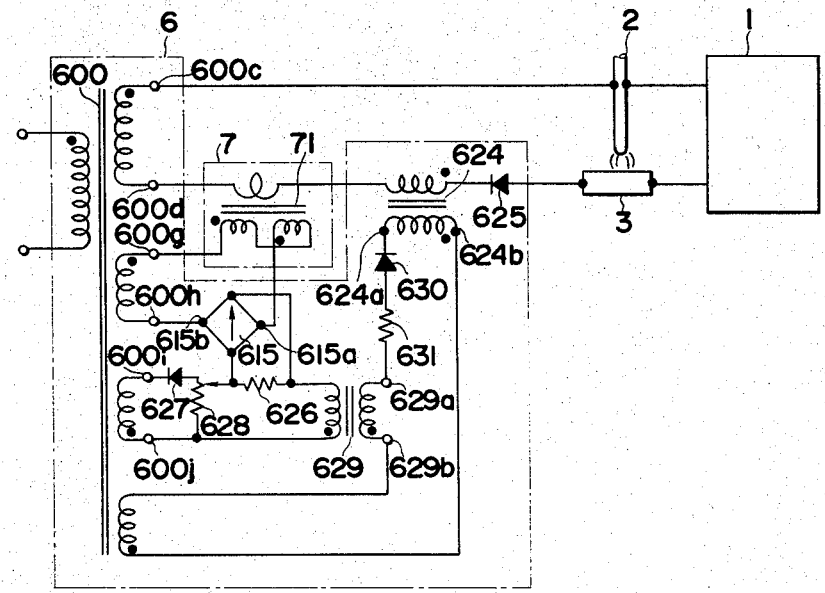

FIG. 6 shows a still further embodiment of the present invention wherein a magnetic amplifier, instead of a thyristor or a variable winding transformer, is employed to control the intensity of the pulse current. In FIG. 6, the transformer 600 has four secondary windings, one end 600c of the first secondary winding being connected to the electrode 2, the other end 600d being connected to the base material 3 through the series circuit, respectively, of the input winding of the current transformer 71, of the output winding of the main magnetic amplifier ( control means ) 624 and of the diode ( pulse producing means ) 624 and of the diode ( pulse producing means ) 625, constructed in the same manner as in FIGS. 4 and 5. Each end of the output winding of the transformer 71 is connected to the input terminal of the rectifier bridge 615 through the second secondary winding of the transformer 600 in the same way as in FIGS. 4 and 5, the resistor 626 being connected between the output terminals of the rectifier bridge 615. The series circuit of the diode 627 and of the variable resistor ( adjusting means ) 628 for setting the pulse current value is connected between each terminal 600i and 600j of the third secondary winding of the transformer, the resistor 626 and the control winding of the auxiliary magnetic amplifier 629 being connected in series between the slider of the variable resistor 628 and the terminal 600j of the transformer. One end 624a of the control winding of the magnetic amplifier 624 is connected to one end 629a of the output winding of the auxiliary magnetic amplifier through the diode 630 and the resistor 631, the other end 624b of the control winding of the magnetic amplifier 624 being connected to the other end 629b of the output winding of the auxiliary magnetic amplifier through the fourth secondary winding of the transformer.

In the device described hereinabove, the difference between the output voltage ( voltage between slider and terminal 600j ) of the variable resistor 628 and the terminal voltage of the resistor 626, is impressed upon the control winding of the auxiliary magnetic amplifier 629, the terminal voltage of the resistor 626 being proportional to the pulse current detected by the transformer 71, the output voltage of the variable resistor being proportional to the set value of the pulse current. Thus, the difference voltage corresponds to the divergence from the set value of the pulse current provided additionally to the welding current as in FIGS. 4 and 5.

As the pulse current becomes smaller than the set value through either an increase in the arc voltage or a decrease in the power source voltage, the output voltage of the transformer 71 is lowered, whereby the difference voltage impressed upon the control winding of the auxiliary magnetic amplifier 629 through the decrease in the output voltage of the transformer 71 is increased, the iron core of the magnetic amplifier being reset to the direction of the unsaturation, responsive to the magnitude of the winding voltage. In the next half cycle, the impedance of the output winding is high, since the iron core of the auxiliary magnetic amplifier 629 becomes unsaturated, the current not flowing to the output winding if the induced voltage of the fourth secondary winding of the transformer is impressed upon the output winding of the auxiliary magnetic amplifier. However, as the time integration of the voltage impressed upon the output winding of the auxiliary magnetic amplifier becomes equal to the value corresponding to the magnetic flux reset between the former half cycles, the iron core of the auxiliary magnetic amplifier 629 becomes saturated and the impedance of the winding becomes lowered. Thus, the current flows to the control winding of the main magnetic amplifier 624 to reset the iron core of the main magnetic amplifier to an unsaturated condition. The time elapsed, until the current flows to the control winding of the main magnetic amplifier, is proportional to the amount to which the iron core of the auxiliary magnetic amplifier is reset, in the former half cycle. The greater the reduction from the set value of the detected pulse current becomes, the smaller the amount, to be reset, of the main magnetic amplifier becomes. In the next half cycle in which the main magnetic amplifier was reset in the unsaturated direction, the main magnetic amplifier conducts when the time integration of the voltage to be impressed upon the output winding has been equalized to the value corresponding to the magnetic flux reset to the former half cycle. The conduction phase advances more as the amount to reset the main magnetic amplifier is smaller. Accordingly, as the detected pulse current reduces, the conduction phase of the main magnetic amplifier advances in accordance with the reduction amount thereof, whereby the pulse current increases. The operations continue until the difference voltage becomes zero, thereby to retain the pulse current to the set value. When the pulse current has increased more than the set value, the conduction phase of the auxiliary magnetic amplifier advances by performing the opposite operation of what is described hereinbefore, the conduction phase of the main magnetic amplifier being delayed to reduce the pulse current to maintain the pulse current at the set value.

The detecting means for the pulse current employed in the present invention permits the use of a Hall element, in addition to the shunt or the current transformer. Also, in each example described hereinbefore, the frequency of the pulse current to be additionally provided is same as the power source frequency. The present invention can be applies even when the frequency of the pulse current is selected from a fraction of to several times the power source frequency. For example, in FIG. 3, for an intermediate tap provided in the first secondary winding of the transformer 600, the intermediate tap being connected to the shunt 70, the anodes of two thyristors being connected between both ends 600c and 600d of the first secondary winding, the pulse current, having a frequency twice as high as the power source frequency, is obtained by connecting the cathode of each thryistor to the electrode 2.

In accordance with the present invention, the intensity of the pulse current is maintained constant even when the arc voltage or the power source voltage changes during the welding, whereby the pulse current value is not required to be adjusted in accordance with the variation of each voltage described hereinbefore. Thus, equal welding results are obtained through the improvement of the welding performance.

Although the present invention has been fully disclosed in conjunction with the preferred embodiments thereof with reference to the accompanying drawings, it is to be noted that these are only for the purpose of illustration and various changes and modifications are apparent to those skilled in the art. Therefore, without departing from the scope of the present invention, these changes and modifications should be construed as included therein.

I claim:

1. In a pulse arc welding device for periodically superimposing a pulse current from a pulse current source on a D.C. welding current from a D.C. source to be fed between a welding electrode and a workpiece to be welded, the improvement which comprises a pulse current detector; a thyristor; a transformer connected between said pulse current source and said electrode and said workpiece through said pulse current detector and said thyristor; a variable voltage reference device including rectifier means connected to said transformer for rectifying a voltage across a secondary winding of said transformer, a diode connected to the output of said rectifier means and a potentiometer having a movable tap and being connected in parallel to said diode for providing a reference voltage; comparison means including a reference capacitor for comparing a voltage corresponding to the current detected by said pulse current detector and said reference voltage, said capacitor being connected to said movable tap and between the output terminals of said pulse current detector; adjusting means for adjusting the pulse current supplied to said welding electrode and workpiece by control of said thyristor including a resistor, a unijunction transistor and a pulse transformer connected in series across said potentiometer, said pulse transformer having an output winding connected with the cathode and gate terminals of said thyristor, and means for supplying an electrical signal indicative of the difference between said detected voltage and said reference voltage to said adjusting means, including a transistor, a resistor and a second capacitor connected in series across said potentiometer, the base of said transistor being connected to said reference capacitor, the emitter of said unijunction transistor being connected to a common junction point between said resistor and said second capacitor.

2. A pulse arc welding device as claimed in claim 1, wherein said pulse current detector comprises a D.C. shunt.

3. A pulse arc welding device as claimed in claim 1, wherein said pulse current detector comprises a magnetic amplifier.

* * * * *